US009874041B1

(12) United States Patent
Briscoe

(10) Patent No.: US 9,874,041 B1
(45) Date of Patent: Jan. 23, 2018

(54) PORTABLE TOOL FOR EMERGENCY ACCESS TO A PRIVACY PARTITION

(71) Applicant: James Dana Briscoe, Springfield, VA (US)

(72) Inventor: James Dana Briscoe, Springfield, VA (US)

( * ) Notice: Subject to any disclaimer, the term of this patent is extended or adjusted under 35 U.S.C. 154(b) by 385 days.

(21) Appl. No.: 14/678,593

(22) Filed: Apr. 3, 2015

Related U.S. Application Data

(60) Provisional application No. 61/978,375, filed on Apr. 11, 2014.

(51) Int. Cl.
*E04G 23/08* (2006.01)
*E05B 19/20* (2006.01)
*B66F 15/00* (2006.01)
*B25J 1/02* (2006.01)

(52) U.S. Cl.
CPC .............. *E05B 19/20* (2013.01); *E04G 23/08* (2013.01); *B25J 1/02* (2013.01); *B66F 15/00* (2013.01); *E04G 2023/088* (2013.01)

(58) Field of Classification Search
CPC ... E05B 19/20; E04G 23/08; E04G 2023/088; B66F 15/00; B25J 1/02
See application file for complete search history.

(56) References Cited

U.S. PATENT DOCUMENTS

| | | | | |
|---|---|---|---|---|
| 1,431,389 A * | 10/1922 | Frisz | ................... | B25B 23/16 279/14 |
| 1,553,713 A * | 9/1925 | Page | ................... | E04G 23/08 254/114 |
| 2,374,530 A * | 4/1945 | Fiebke, Sr. | ............. | E04G 23/08 254/120 |
| 2,921,773 A * | 1/1960 | Hoelzer | ................... | B65G 7/12 254/129 |
| 3,041,042 A * | 6/1962 | Sanders | ................... | E04G 23/08 254/130 |
| 4,334,445 A * | 6/1982 | Timewell | ............. | B25B 13/481 81/177.7 |
| 4,607,406 A * | 8/1986 | Davis, Jr. | .................. | B25F 1/02 7/100 |
| 5,943,925 A * | 8/1999 | Huang | ................... | B25G 1/007 81/177.1 |
| 7,677,619 B2 * | 3/2010 | Hutchings | ............ | B25J 11/0025 294/105 |

(Continued)

*Primary Examiner* — Christopher Harmon

(57) ABSTRACT

An emergency access tool is designed to unfold into unique geometrical shapes that allow for the tool to act as a Class 1 lever to access a locked privacy partition stall door from the outside area thereof. The tool provides a handle to impart input force, a shaft rotatable out of a collapsed position of storage within the handle into alternative fixed operating positions with respect to the handle, a proximal portion of the shaft having a reduced diameter intermediate section, the intermediate section providing a fulcrum point where leverage is achieved while the tool is inserted within the door seam of the partition, and a distal end section which maintains a substantially perpendicular orientation with respect to the shaft during use of the tool. The end section of the tool is sized and adapted to make contact with the interior door lock of the partition and impart the output force necessary to unlock the lock latch and allow entry into the privacy partition stall.

17 Claims, 8 Drawing Sheets

(56) References Cited

U.S. PATENT DOCUMENTS

| | | | | |
|---|---|---|---|---|
| 8,434,739 B1* | 5/2013 | Connolly | ............... | B66F 15/00 |
| | | | | 254/130 |
| 8,474,353 B1* | 7/2013 | Thoman | ................ | B25G 1/007 |
| | | | | 81/177.6 |
| 9,363,990 B2* | 6/2016 | Squires | ................ | A01M 31/02 |
| 2004/0181904 A1* | 9/2004 | Steltzer | ................... | B25G 1/04 |
| | | | | 16/110.1 |
| 2010/0122419 A1* | 5/2010 | Zupancic-Albin | .... | A61J 7/0007 |
| | | | | 7/125 |

* cited by examiner

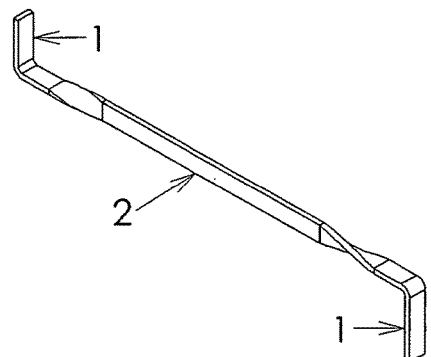
Figure 1A
(Prior Art)
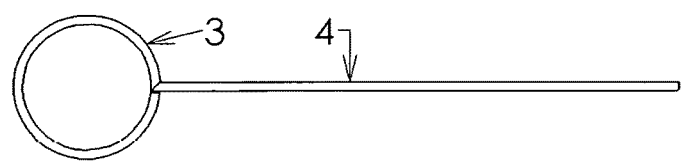
Figure 1B
(Prior Art)
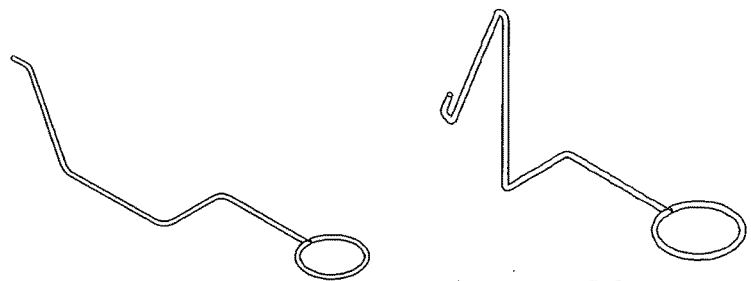
Figure 1C1     Figure 1C2
(Prior Art)

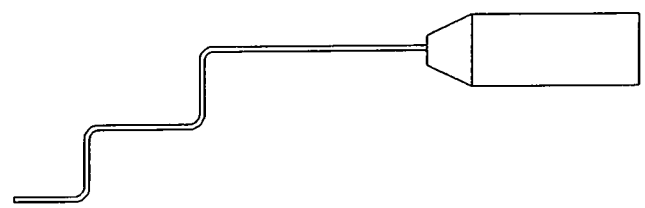
Figure 1D1
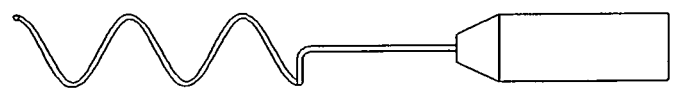
Figure 1D2
(Prior Art)

PORTABLE TOOL FOR EMERGENCY ACCESS TO A PRIVACY PARTITION

CROSS-REFERENCE TO RELATED APPLICATIONS

This application claims priority to U.S. provisional patent application No. 61/978,375 filed on Apr. 11, 2014 and titled Portable Tool for Emergency Access to a Privacy Partition, herein incorporated by reference in its entirety.

BACKGROUND OF THE INVENTION

Instances are known to occur when a user of a privacy partition stall, such as a bathroom stall or fitting room, may encounter a distressful situation where said user of the stall may be unable to work the lever of the stall door latch lock and allow the stall door to be opened. Unfortunately current methods to gain access to a locked stall door to provide assistance to a person who has for some reason become incapacitated inside the stall involve either crawling under the stall door or climbing over the stall door or a wall of the stall partition. Stall door manufacturers do offer doors that can be lifted up and swung outward to gain access, but this method is cumbersome, time consuming and potentially dangerous, should the first responder lose control of the door and injure the person in distress. After extensive research this inventor decided to improve over these inefficient methods of reaching such a person to provide them aid.

Tools were known in the relevant art for emergency opening of doors for access to the interiors of dwellings and vehicles.

One category of the existing art addresses the need to gain access to the interior of a locked vehicle from a location exterior to the vehicle operator's compartment. In this application locksmiths commonly use tools which include probe-like portions which can be inserted between the glass window of a vehicle and the hollow door supporting the window and which include end portions that are designed to manipulate the locking mechanism in the interior of the door. Examples of such devices are shown in Fanberg U.S. Pat. No. 4,683,783, Parkins U.S. Pat. No. 4,655,102, Williams U.S. Pat. No. 4,873,897, and Selby U.S. Pat. No. 4,882,954. Child U.S. Pat. No. 6,591,473 teaches an additional method of releasing the door lock of an automotive vehicle from a location exterior to the vehicle. The tool includes an elongated rod-like probe which can be inserted between the vehicle door and its door frame. Once the probe is inserted into the vehicle operator's compartment, the tip of the probe can be used to manipulate an unlocking mechanism inside the vehicle. This tool would be unsuitable for use for unlocking privacy partition latches, in which the latch is near to the tool user but not visible.

Another common application in the field of locksmithing addresses the need to open key locks embedded within barrier doors or doorknobs. FIG. 1A shows a typical prior art tensioning tool also known as a torsion wrench for biasing the rotational position of a lock plug within a lock casing so that a lock pick may be effective. Such a tool typically has a flattened head 1 at one or both ends which in the latter case may be of differing lengths and connecting member 2 perpendicular or near perpendicular thereto. Alternatively the head may be stepped in transition for accessing within recessed knob surfaces. The shaft is at least in part flattened in the general plane of the tool in order to provide a hand contact surface as opposed to an edge in the direction of force application as the tool is inserted within a lock and twisted. Such a torsion wrench tool is designed to be used in combination with lock picks such as those described in Tobias et al U.S. Pat. No. 8,302,439 and Randall U.S. Pat. No. 6,151,936. Tobias et al show an angulated thin-wire tool 60 in FIG. 7 which is sized and adapted to be inserted into a keyway of a pin-tumbler type lock in order to engage the slider within the keyway. Randall teaches use of a stepped tip retainer pick for insertion into a padlock keyway.

Additional lock tools are designed to open locked doors to building partitions from a location exterior to the partition. Helmers U.S. Pat. No. 5,540,121 pertains to a tool designed to open a locked door which has a circular doorknob on its interior side. The tool comprises a cup rotatably mounted to an arm and handle section. The cup can be collapsed to permit it to be passed underneath said door along with the attached arm. The handle section, which remains on the outside of the door, can then be used to manipulate the orientation and position of said arm and cup so that the open side of the cup is fitted over the doorknob. Means are provided so that the user is able to cause the cup to grip and turn the doorknob to open the door. Dyer U.S. Pat. No. 5,123,307 is directed to a similar device as described in Helmers but which uses a grip pad which can engage the doorknob and open the door.

FIGS. 1B through 1D show examples of locksmith tools for accessing and manipulating door latches which are recessed within a door and/or covered by a rabbet or door jamb. FIG. 1B shows a wire tool of spring-steel comprising a handle section 3 and a straight section 4 which is designed to be bent by the user by trial and error to access the rabbet or groove of a door jamb in order to manipulate a latch bolt in a relatively time unconstrained process. FIGS. 1C1 and 1C2 show variants of preformed three-dimensionally angulated wire needles for respectively manipulating slide and pivoted throw latches such as found in a flight door. FIGS. 1D1 and 1D2 show very thin 1-2 mm diameter wire tools of 'stairstep' and corkscrew types which are used to access a door jamb in order to manipulate for example that portion of the bolt of a doorknob assembly which is extending into the strike plate.

Devices such as shown in FIGS. 1C1-2 and 1D1-2 are structurally complex, spatially bulky, and subject to entanglement when incorporated into a rescue kit for emergency personnel. The devices in FIGS. 1B through 1D are unsuitable for storage within their handle which is typically a space-consuming addend. The device in FIG. 1B has an additional disadvantage in that it must be bent by trial and error, which would render it undesirable for use in time-constrained rescue situations.

FIELD OF INVENTION

This invention relates to a hand tool and in particular a portable hand tool that has been designed to rapidly access and manipulate a privacy partition such as a bathroom door latch lock as in the event of an emergency when the user of a bathroom stall is unable to release the bathroom stall door slide latch lock and open the bathroom stall door. The tool may be designated as an Emergency Bathroom Access Tool, or EBAT.

BRIEF SUMMARY OF THE INVENTION

The Emergency Bathroom Access Tool is an invention that will allow a first responder to easily insert the said tool through the opening between the stall door and partition wall and, using said tool as a lever, make contact with the stall door latch lock lever handle and slide or pivot the lock to the unlocked position, thus opening the stall door and gaining access to the person inside who needs assistance. The invention provides numerous improvements over the prior art. Its simple geometry allows for intuitive ease of use, minimal weight and bulk, and easy storage within a rescue pack or tool box with no risk of entanglement with other items. It is rapidly deployable which makes it ideal for use in an emergency situation, and it is versatile in that it can be used to open a variety of both throw latches and slide latches. While the acronym EBAT is used as a nomenclature for the tool, it is understood that the tool may be used for opening other privacy partitions and for emergencies other than incapacitation of the occupant.

BRIEF DESCRIPTION OF THE DRAWINGS

The invention consists in the details of construction and combination of parts as will be more fully understood from the following description, when read in conjunction with the accompanying drawings, in which:

FIG. 1A shows a typical prior art tensioning tool also known as a torsion wrench for biasing the rotational position of a lock plug within a lock casing.

FIG. 1B shows a wire tool of spring-steel which is designed to be bent by the user by trial and error to access the rabbet or groove of a door jamb.

FIGS. 1C1 and 1C2 show three-dimensionally angulated wire needles for respectively manipulating slide and pivoted throw latches such as found in a flight door.

FIGS. 1D1 and 1D2 show very thin 1-2 mm diameter wire tools of 'stairstep' and corkscrew types which are used to access a door jamb in order to manipulate for example a portion of doorknob latch bolt.

DETAILED DESCRIPTION OF THE INVENTION

Figures 2A, 2B:
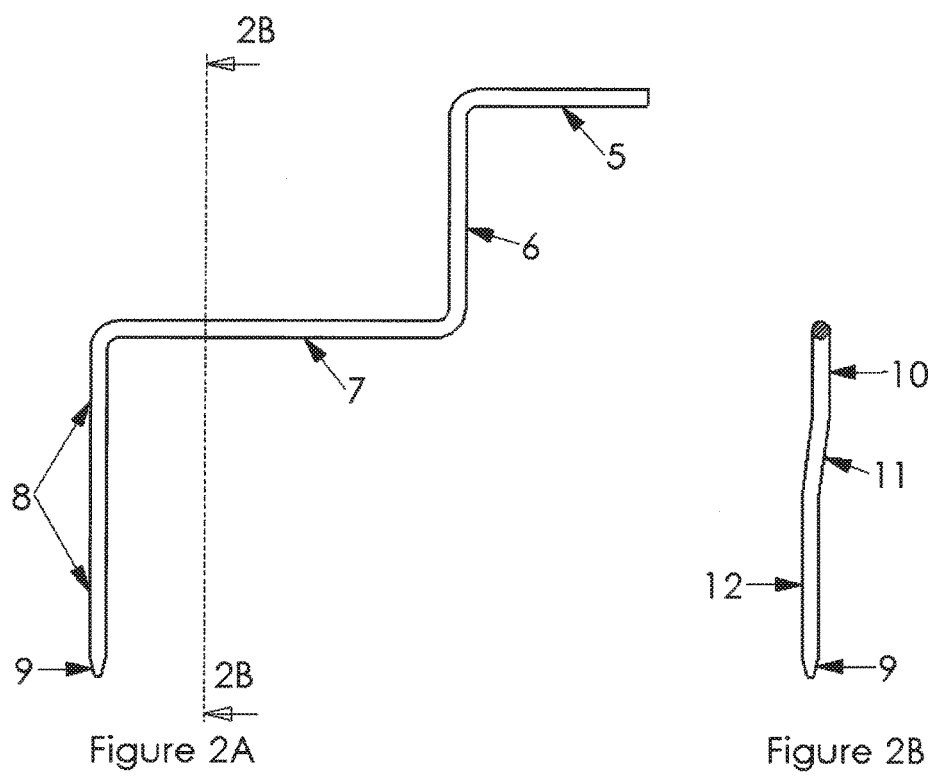
FIG. 2A shows a skeletal prototype tool associated with the invention which was contrived for studying feasibility of accessing partition type restroom stall doors as are commonly found in commercial establishments.
FIG. 2B shows a section view of the skeletal prototype tool illustrating the offset bend of the tool end effector.

FIG. 2A shows a skeletal prototype tool associated with the invention which was used for studying feasibility of accessing partition restroom stall doors as are commonly found in major restaurants and service stations. The tool was fabricated from stiff 0.250 inch diameter steel round stock. The 0.250 inch diameter rod prototype was found to open approximately 80% of the partition stalls that were included in the feasibility study. A residual rod using a smaller diameter 0.187 inch (3/16) steel round stock significantly improved the success rate of the prototype tool, from the 80% success rate of the 0.250 inch to over 95% while using the residual, smaller diameter prototype tool during a follow-on feasibility study. The prototype tool was fabricated such that a short handpiece 5 transitions at a right angle to a torque arm 6 bent at a right angle to a portion which serves as the turn axis of the tool, and which transitions at a right angle to a distal portion 8 which serves as the tool end effector to engage with the latch handle of the partition door. During use of the tool, the user holds the turn axis portion 7 of the tool in a horizontal orientation within the partition seam of the stall door. The user may then fix the vertical location of the turn axis portion 7 at an appropriate height within the partition seam such that the turn axis portion 7 may serve as a fixed fulcrum axis while the slide latch handle is manipulated using the distal portion 8. The distal portion 8 includes a chamfered or otherwise rounded and thinned blunt end to facilitate the insertion of the tool into the partition seam. FIG. 2B shows a sectional view of the tool and its effector end 8 and illustrates the features which comprise this distal portion. A short stub shaft portion 10 with a length of 2.75 to 3.5 inches was found to be suitable in one embodiment, however small variations in length were also found to work well. In a preferred embodiment the stub shaft was found to be exemplary at 3.0 inches in length. The short stub shaft portion is oriented within the same plane as the turn axis 7, the torque arm 6, and the handpiece 5. A pair of complimentary angle bends in the transition regions of segment 11 result in an offset of 1/4 of an inch to 3/16 of an inch which was found to be suitable in one embodiment but may be as small an offset as 1/16 of an inch preferably and allows the throw portion 12 to be substantially parallel to the general plane of the tool but to be offset to provide improved reach, given that the handle of a privacy stall latch lock is typically offset from the privacy partition seam.

Figure 3:
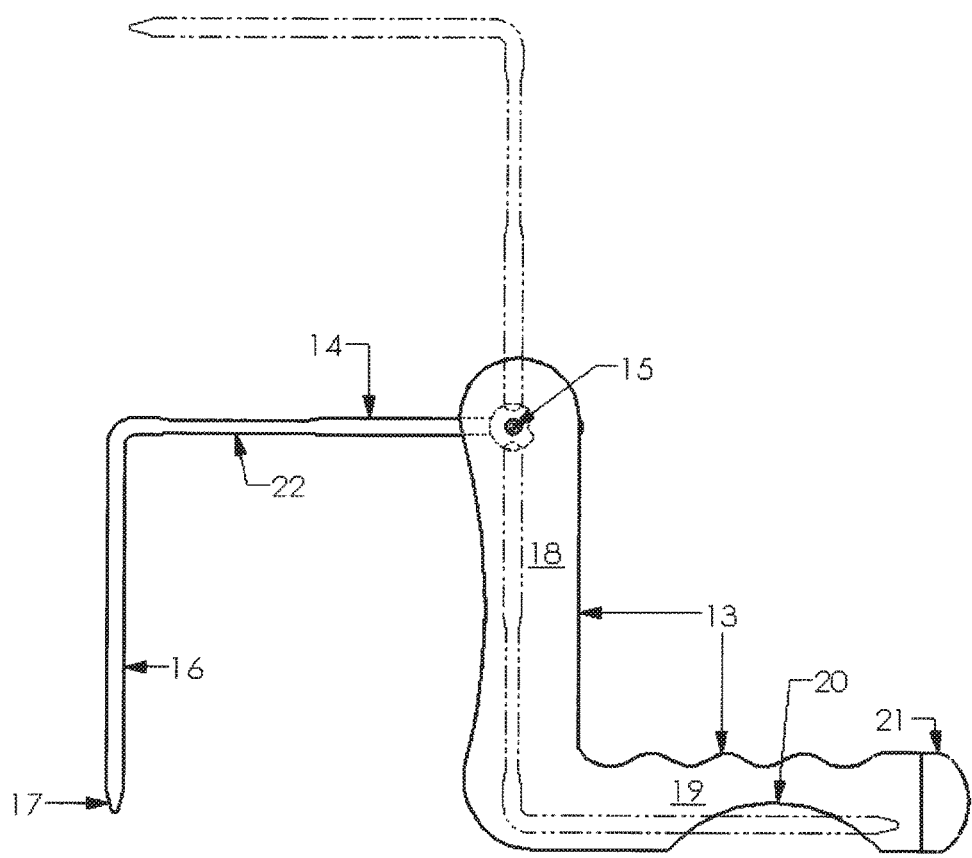
FIG. 3 illustrates a first embodiment of the tool known as the pistol-grip embodiment.

FIG. 3 presents a first embodiment of the tool, from here on referred to as the pistol-grip embodiment, which includes a handle section 13, a proximal shaft 14 pivotally attached thereto via a cam having a pivot pin 15, and a distal work shaft integral with and at substantially a right angle to the proximal shaft 14. The proximal shaft 14 functions as the turn axis of the tool and the distal shaft 16 functions as the tool end effector akin to what has been described in the prototype tool shown in FIG. 2 under reference numbers 7 and 8. The distal portion 16 preferably terminates in an omnidirectionally rounded or chamfered tip 17. The handle section 13 of the tool comprises a first portion 18 extending along a first axis which includes the central point of pivot pin 15. In one embodiment, the central pivot pin 15 is provided by a hardened steel pin of 0.090 inch diameter, with slight variations in pin diameter also found to be suitable. The second handle portion 19 extends along a second axis substantially perpendicular to the first axis. The second portion includes an access cutaway 20 to facilitate user access to the distal shaft 16 for rapid opening of the tool. Opening the access tool permits the proximal shaft 14 to open out of its retention groove into extension, from 0 degrees into either a 90 degree or a 180 degree operating position relative to the first axis of the handle 13. This duality of operational positions enables a rescuer to quickly apply torsional leverage to an interior latch using either the first handle portion 18 if in the 90 degree pivot orientation or using the second handle portion 19 to apply this leverage when in the 180 degree pivot position dependent upon the local partition clearances in the particular access situation. In the 90 degree case, the distal shaft portion 16 is oriented by its tip in an antiparallel direction to the axis of the handle first portion in a direction towards the pivot pin 15. All of the aforementioned components are constrained to remain within a single planar region when referenced to each other during rotational manipulation of the tool.

The tool handle 13 is preferably fabricated by molding using an injection plastic molding procedure. Such procedures are known, for example as discussed in U.S. Pat. No. 6,185,771 or other types of plastic injection molding that are known to exist in industry. It is however to be understood that a handle could also be constructed from sections of sheet metal or aluminum by folding and bending or by additive or subtractive metal working processes, or be made of wood. In one embodiment the tool handle may be modified to act as a multi-tool device with features such as a writing pen that would slide within the body of the handle, prying devices, various size screw drivers or a flashlight embedded within or attached to the handle. In one embodiment the material for the proximal shaft 14 and distal shaft 16 is stainless steel, 3/16 inches in diameter. While 3/16 inch rod may be exemplary, small variations in rod size were also found to be suitable. Alternatively one or both of the shafts could be made from aluminum, copper, brass, carbon steel, or a grade of steel or plastic that provides sufficient stiffness and beam rigidity as to not bend and experience plastic deformation and yield in a fashion that would preclude the shafts from imparting sufficient force to perform their functions.

FIG. 3 additionally illustrates adaptations which are incorporated into the tool. The handle 13 of the tool incorporates a protrusion edge 21, which is also illustrated in a top view in FIG. 5A, and which can be used to immediately open latches of the type which include a slotted cover on the side of the door exterior to the partition for emergency opening of the latch. The protrusion of the tool is shaped in such a way that it can be inserted into the slot and used to provide a torque to the latch cover via the first handle portion 18, in order to open the latch. The protrusion edge may be flattened or slightly convex as shown. FIG. 3 also illustrates a section of reduced diameter 22 of the proximal shaft 14 relative to the otherwise relatively constant larger diameter of the remainder of the proximal and distal shafts. In the event that the gap of the partition seam is smaller than this larger general diameter of the proximal and distal shafts (which diameter has been predetermined by experimentation to fit such door partition seams in the majority case of typical commercial establishments), the tool may be thereby nonetheless inserted into the seam at the top or the bottom of the door and then moved along the partition seam until the vicinity of the latch is reached. In a preferred embodiment, the larger constant diameter may be reduced by 0.050 to 0.060 inches in order to achieve this reduced diameter. In a preferred embodiment, this reduced diameter intermediate section occupies predominantly the distal region of the proximal shaft 14 so that the user may grasp the proximal region of the shaft, which remains external to the partition, with their fingers and move the shaft with precision along the seam. The reduced diameter intermediate section was also found to be suitable when it occupied a section of the proximal shaft beginning 1½ inches from where the proximal shaft is connected to the cam, as shown in FIG. 5D and extending along the proximal shaft for a distance of 1 inch to 1½ inches with slight variations suitable. The reduced diameter intermediate section would preferably terminate about ¼ of an inch from the distal end of the proximal end shaft where the distal shaft and proximal shaft meet to form a right angle with the machined down section of the proximal shaft, which comprises the reduced diameter intermediate section, beginning ¼ of an inch from the area of the substantial right angle of the distal and proximal shaft and extending to a length of 1.250 inches along the proximal shaft. It is to be understood that small variations from these dimensions may also be suitable for the device to perform its functions.

Figure 4A:
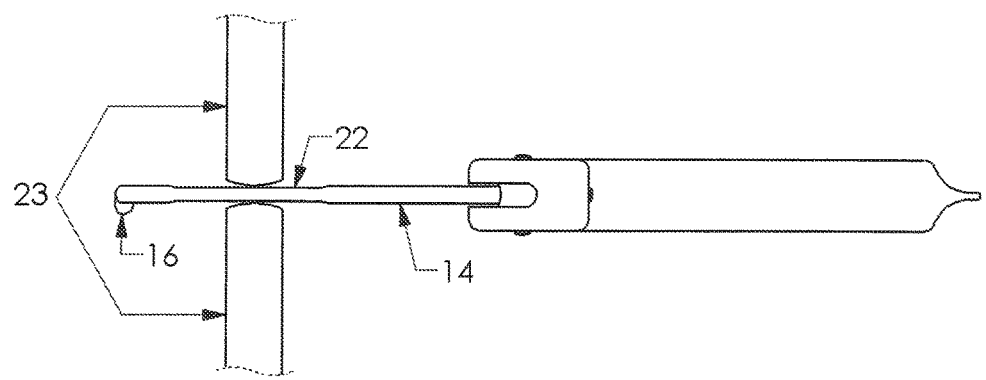
FIG. 4A shows a top view of the tool illustrating a method of use of the reduced diameter portion for alignment within a partition.
Figure 4B:
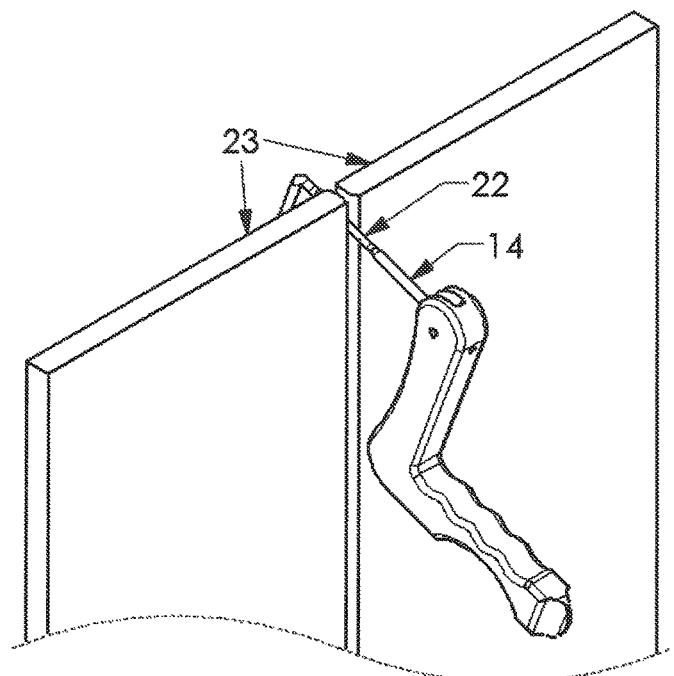
FIG. 4B shows an additional view illustrating a method of use of the reduced diameter portion.

FIG. 4A illustrates this method of use by showing a view from above as the reduced diameter portion 22 is placed in the seam between the door or partition wall sections 23 when the seam gap is too narrow to accommodate the larger diameter of the distal and proximal shaft portions 16 and 14. The length of the reduced diameter portion 22 is designed to be longer than the typical width of partition doors or walls 23 for two reasons. One reason is to allow room for adjustment of the spacing between the distal shaft 16 and the interior surface of the partition door or wall 23 to account for a variety of latch designs. Another reason, as displayed in FIG. 4B, is to allow for a range of angles to horizontal at which the user may hold the tool while the proximal shaft is moved along the length of the partition seam, meaning that the user is not required to maintain an orthogonal orientation between the proximal shaft 14 and the partition door or wall 23 as the overall tool is moved in the height direction relative to the floor. It is noteworthy that the tool may be inserted into the seam either above or below the latch, depending upon any interfering seam irregularities which might hamper the shaft movement along the seam, and the distal shaft may therefore access the latch for opening the latch in either a clockwise or counterclockwise rotational direction.

Figures 5A, 5B:
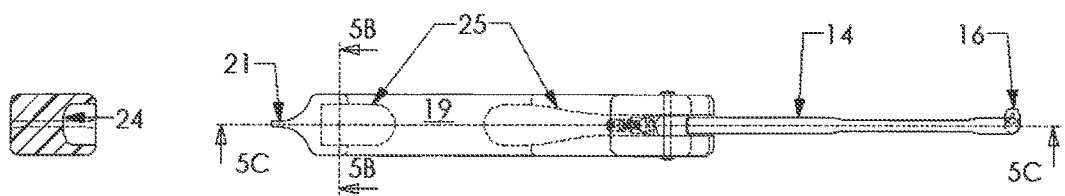
FIG. 5A shows a top view illustrating a method of construction of the pistol grip embodiment.
FIG. 5B shows a section view of a method of construction of the pistol grip embodiment illustrating the retention groove in the handle.

FIG. 5A shows a top view of the pistol grip embodiment. The protruding edge 21 is generally coplanar with the axis of symmetry of the second portion of the handle 19. This permits ease of orientation of the slot and handle relative to a slotted exterior latch cover, should one be present. In a section view in FIG. 5B the bottom 24 of the retention groove 25 is shown as having an arc shape, however a flat bottom groove would also be suitable. The distal shaft 16 is shown in slight offset from the plane of the tool as was discussed in relation to the prototype as shown in FIG. 2B as elements 10, 11, and 12. Hence the retention groove 25 is necessarily slightly wider in its region which accommodates the distal shaft 16 than it need be where it accommodates the proximal shaft 14.

Figure 5C:
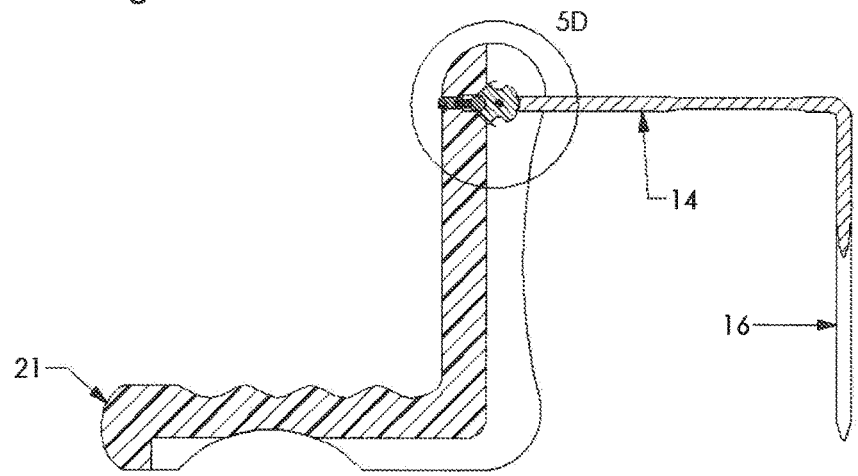
FIG. 5C shows an additional section view of a method of construction of the pistol grip embodiment.
Figure 5D:
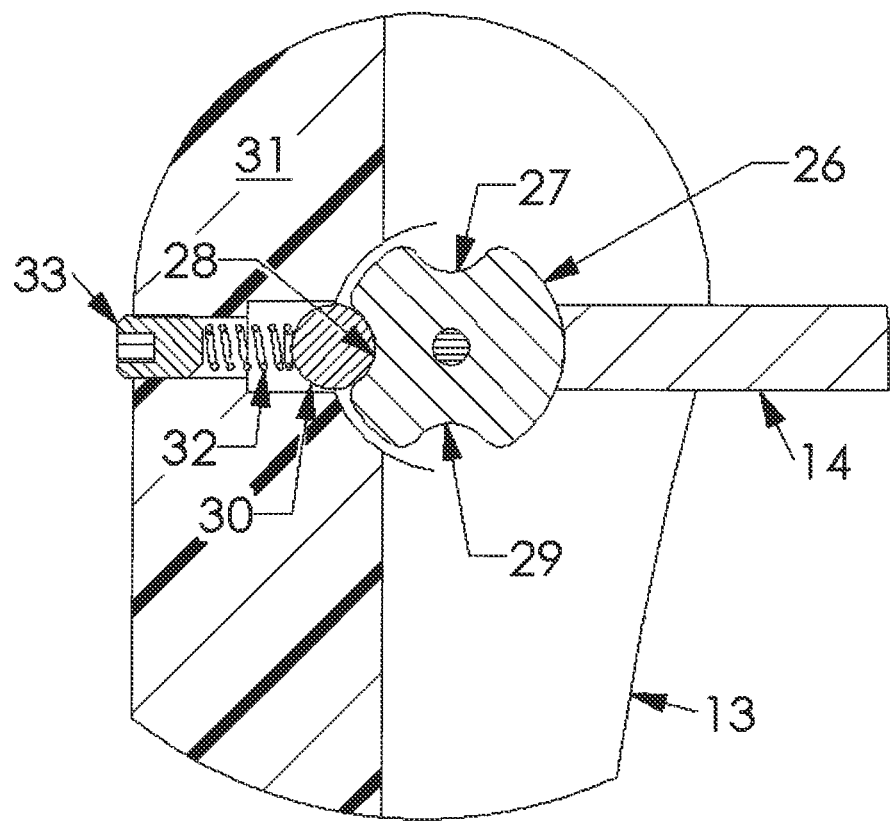
FIG. 5D shows a detailed view of one mechanism in the proximal pivot region of the tool used to temporarily constrain the proximal shaft orientation during use or during storage of the tool.

FIG. 5C shows a section view of the pistol grip embodiment illustrating the internal components, and FIG. 5D shows an enlargement of the pivot region of the tool, towards which the ensuing description is directed. FIG. 5D illustrates the preferred mechanism used to constrain the proximal shaft 14 position to either the collapsed (0 degree extension) position, the 90 degree extension position, or the 180 degree extension position, relative to the first axis of the handle 13. The proximal shaft 14 is attached to a cam 26 which is constrained within the handle with a pivot pin so as to be oriented in thickness along a direction substantially parallel to the turn axis of the proximal shaft 14. The shaft may be welded to the cam, or alternatively a tap and die may be used to install threading for the components, or alternatively an adhesive bonding agent may be used on the shaft's proximal end together with a drilled mating hole in the cam.

The outer surface of the cam includes three grooves 27, 28, and 29 which are used to constrain the position of the proximal shaft 14. A detent ball is constrained to motion along a line substantially perpendicular to the turn axis of the proximal shaft by the detent mechanism housing 31 which is integral with the handle 13. A compression spring 32 imparts force on the detent ball 30 which causes the ball to maintain contact with the outer surface of the cam 26. A set screw 33 is used to constrain the opposite end of the spring and to provide the user with the ability to adjust the magnitude of force applied to the detent ball 30. The detent ball will contact the cam 26 in grooves 27, 28, or 29 respectively when the proximal shaft 14 is in a 180 degree extended position, 90 degree extended position, or 0 degree collapsed position. This mechanism provides temporary restriction of motion of the proximal shaft while the tool is in use yet still allows for rapid adjustment of the tool. Alternative methods to provide a secure feel to the 0 degree collapsed position, the 90 degree extended position and the 180 degree extended position include the use of side locks, for example a liner lock having a resilient leaf or plate spring internal to the handle or a frame lock, or a locking mechanism known as a lockback or backlock design whereby such a spring is located on the back of the tool handle or other suitable location which biases a transfer arm into engagement with a depression, a notch or other indentation such as a flattened region on the heel of the proximal shaft. Such mechanisms are known per se in association with the locking of pocketknife or "Swiss army knife" tool into a fixed position. The proximal shaft itself, in any of the aforementioned embodiments, may be integrally formed so as to perform the cam lock function in combination with the mentioned co-acting components, such as by bending the shaft into a loop around the pivot axis and milling a flat or contoured depression into the loop wall or additively forming such an adaptation in conjunction with the shaft buildup. Other methods to bias the aforementioned positions of the tool would include a spring to apply pressure or spring load against the shaft as well as other types of biasing structures that are known to the art.

Figure 6A:
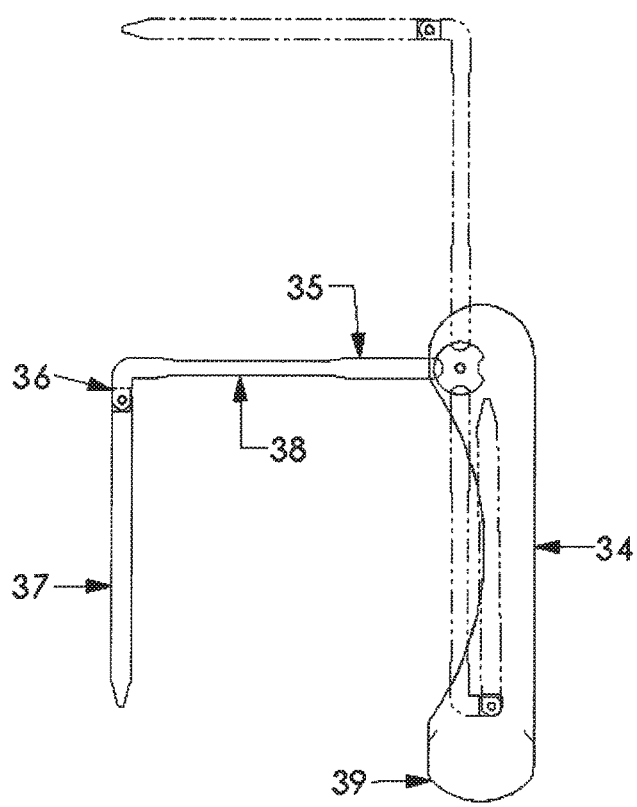
FIG. 6A illustrates a second embodiment of the tool known as the dual pivot embodiment.

FIG. 6A shows an alternative embodiment of the tool, from here on referred to as the dual pivot embodiment, which improves upon the pistol grip embodiment by providing a more compact and streamlined geometry of the tool during storage. In this embodiment the tool comprises a handle 34, a proximal shaft 35 pivotally attached thereto, an intermediate stub shaft 36 integral with the proximal shaft and at substantially a right angle thereto, and a folding distal work shaft 37 pivotably attached to the stub shaft end. All of the aforementioned components are constrained to act generally within a single plane of motion during opening and closing. Opening the access tool permits the proximal shaft 35 to open from 0 to 180 degrees in extension relative to the long axis of the handle 34. The distal shaft 37 has a pivot axis offset from the proximal shaft 35 by the approximate length of the intermediate stub shaft 36, and this pivot axis is oriented in a direction substantially orthogonal to the aforementioned plane of motion of the tool. This enables a range of distal shaft 37 motion from substantially 0 to 90 degrees when measured with respect to the proximal shaft 35 axis. The distal shaft 37 may be locked in its 90 degree position by a locking mechanism as aforementioned and alternative pivot locking mechanisms. Note that a slight 'over-travel' with respect to 0 degrees will occur when the distal shaft in collapsing can travel slightly past the antiparallel direction to the proximal tool shaft 35 when the distal and proximal shafts are collapsed for storage within the handle. The manner of operating the tool is otherwise the same as was generally described with respect to FIGS. 4 to 5.

Figure 6B:
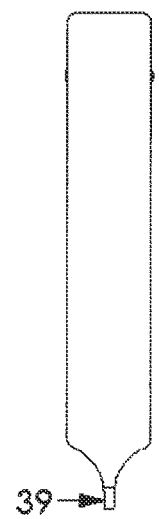
FIG. 6B shows a side view of the dual pivot embodiment illustrating the ridged protrusion.

Similar to the pistol grip embodiment, the dual pivot embodiment includes a reduced diameter portion 38 within the proximal shaft 35 and a ridged protrusion 39 which is displayed in a side view in FIG. 6B. This reduced diameter intermediate portion 38 may have a length and cross section and location along proximal shaft 35 which is analogous to those described in relation to like component 22 above. Additionally, tolerances, shaft diameter, length and locations may be associated with 22 above.

In preferred embodiments the said proximal shaft preferably has a generally rounded cross-section so as to enable rotation of the proximal shaft within the clearance seam of the partition door. The intermediate stub shaft and the distal shaft may be rounded in cross-section or may have a cross section which is slightly elongated in the direction of throw of the bolt mechanism of the partition latch in order to provide additional structural stability. In alternate embodiments the proximal shaft may be of square cross-section slightly undersized with respect to partition clearance seam width such that rotation within the partition clearance seam may still occur. In this case the manipulated shaft may give additional 'feel' as to the current rotational orientation of the stub shaft axis and distal tool shaft.

The tool distal shaft may optionally have end-adaptations such as a 'spooning' indentation within the distal shaft diameter and having a surface direction generally orthogonal to the plane of the tool shaft when in its working orientation. In this embodiment the curvature radius of the spooning preferably would increase from distal to proximal along the shaft axis and along a location segment which typically associates with the latch engagement location as it varies during rotational manipulation of the tool. This curvature improves the ease and efficiency of the latch manipulation motion because it allows the force applied the sliding latch by the throw arm to be maintained in a direction generally aligned with the direction of sliding motion of the latch. In other embodiments the end of the distal shaft could be flattened out into a spoon like concavity shape or threaded to allow adapter tool ends of various shapes and lengths to be "screwed onto" or threaded onto the distal shaft. These would be utilized as unlocking devices or helper aid tools.

While the example of a safety access circumstance has been given it is understood that an emergency security or service access for closure is also contemplated, for example in the circumstance of emergency service closure of the partition from the exterior in the event of a toilet malfunction and/or hygienic cleanup requirement where any user access is currently undesirable.

While the preferred embodiment has been described in relation to an inswing door with respect to the public or access side it may equally apply to an outswing door of either right or left hand type.

While some embodiments have been described in relation to slide latches the tool may be operated with a repositioning along the partition such that for example a downwardly rotated securement locking ball or stub handle or pin along the slider may be released up out of its detent before throwing the latch to gain access. Such ability may be sufficient to operate a throw latch such as a pivoted latch from its cradle. Additionally a stall door which is a double door may also be opened. Additionally the stall need not be fixedly located but may be in a mobile vehicle such as a train or aircraft or tour bus or cruise ship. Additionally the privacy stall or partition may be for other than a restroom function, for example a gym shower stall or an indoor or outdoor changing room or booth for trying on apparel.

Although the invention has been described in detail for purposes of illustration, various modifications and enhancements may be made without departing from the spirit and scope.

The invention claimed is:

1. A portable apparatus adapted for providing rapid emergency access to a privacy partition stall, comprising:
  a handle having a first handle portion with a first elongation axis and a second handle portion having a second elongation axis, said second elongation axis is at a fixed angle relative to said first elongation axis, the handle including a recess groove coextensive with the first and second handle portions;
  a first shaft section rotatably mounted to said first handle portion at a proximal end, said first shaft section having a distal end;
  a second shaft section attached to said first shaft section at said distal end and adapted to be maintained fixed in a substantially perpendicular orientation with respect to said first shaft section distal end, wherein said first and second shaft sections being adapted to be rotated into said recess groove; and
  a first pivot including a locking mechanism for alternatively locking said first shaft section proximal end into a first operating orientation with respect to said first pivot and substantially perpendicular to said first handle portion elongation axis and a second operating orientation with respect to said first pivot and substantially parallel to said first elongation axis and extending out from said first handle portion,
  whereby said first handle portion is adapted to provide leverage to said second shaft section in a plane of rotation substantially parallel to and offset from a plane of rotation of said elongation axis when said first shaft section is locked into said first orientation, and in a plane of rotation substantially perpendicular to said first elongation axis when said first shaft section proximal end is locked into said second orientation and said second handle portion being adapted to provide leverage when said first shaft section is locked into said second orientation substantially parallel to said first elongation axis and extending out from said first handle portion.

2. The portable emergency access apparatus of claim 1, further comprising said second shaft section having a distal end, and an omni-directionally thinned blunt tip at said distal end.

3. The portable emergency access apparatus of claim 1 or claim 2, further comprising said second shaft section having a proximal second shaft segment attached to the distal end of said first shaft section, an intermediate second shaft segment extending from said proximal second shaft segment at a small offset angle, and a distal second shaft segment extending from said intermediate second shaft segment and in a direction substantially parallel to said proximal second shaft segment.

4. The portable emergency access apparatus of claim 1 or claim 2 wherein said first shaft section has a generally circular cross section along its length and further comprises a proximal segment having a substantially constant cross-sectional diameter along its length, an intermediate segment having a reduced cross-sectional diameter along its length and a distal segment having a cross-sectional diameter substantially equal to said proximal segment cross section diameter.

5. The portable emergency access apparatus of claim 1 or claim 2 wherein said apparatus is sized and adapted to serve as a handheld tool for moving a latch on the inside of said privacy partition stall door via the privacy stall door seam, said shaft sections being sized and adapted for being hand-manipulated via said seam.

6. The portable emergency access apparatus of claim 3, said apparatus being sized and adapted to serve as a handheld tool for moving a latch on the inside of said privacy partition stall door via the privacy stall door seam, said intermediate second shaft segment occupying approximately the middle third of said second shaft segment length, whereby said second shaft section is adapted to optimally engage a latch in a first orientation in order to move said latch to open said door from the stall exterior in the case of an occupant emergency and in a second orientation in order to move said latch to close said door from the stall exterior in the case of a service emergency.

7. The apparatus of claim 4, wherein said apparatus is sized and adapted to serve as a handheld tool for moving a latch on the inside of said privacy partition stall door via the privacy stall door seam, said first shaft section intermediate segment of reduced-diameter occupying approximately a predominantly distal portion of the overall length of said first shaft section, whereby said proximal segment of said first shaft section is sufficiently elongated such that the fingertips of a user of the apparatus can be used to slide the intermediate segment along the partition seam and then anchor the first shaft section as a fulcrum location for rotation of said second shaft section in order to move the latch.

8. The apparatus of claim 1 or claim 2 wherein the second handle portion is integral with said first handle portion and the angle between the first and second handle portions is between 45 and 90 degrees.

9. The apparatus of claim 1 or claim 2, further comprising said first and second shaft sections being integral.

10. The apparatus of claim 1 or claim 2, further comprising said second shaft section having a proximal stub axle segment, said stub axle segment having a distal pivot, said second shaft section having a further distal segment, said distal pivot having a locking mechanism and being adapted to lock said further distal segment into said substantially perpendicular orientation with respect to said first shaft section.

11. The apparatus of claim 10, further comprising said stub axle segment being of sufficient length such that said distal segment can be folded back into a parallel orientation alongside said first shaft section by means of said distal pivot.

12. The apparatus of claim 1 or claim 2 wherein said first locking mechanism includes a detent.

13. The apparatus of claim 12 wherein said locking mechanism further includes a spring-loaded ball and cam.

14. The apparatus of claim 12 wherein said locking mechanism further includes a resilient plate.

15. The apparatus of claim 8, further comprising an elongated ridge attached to said second handle portion whereby a slotted exterior stall latch cover may be manipulated.

16. The apparatus of claim 1 or claim 2, further comprising an elongated ridge attached to said first handle portion whereby a slotted exterior stall latch cover may be manipulated.

17. The apparatus of claim 4, further comprising a recess groove and a fingertip recess in said handle, said pivot being operable to pivot said first and second shaft sections to reside in said recess groove, said fingertip recess being co-extensive along said handle with said reduced diameter intermediate segment of said first shaft section when said first shaft resides in said recess groove whereby the reduced diameter section and fingertip recess cooperate to enable the user's fingertips to rapidly deploy said first shaft section into said first or second operating orientations.

\* \* \* \* \*